United States Patent [19]

Heck et al.

[11] Patent Number: 4,483,755

[45] Date of Patent: Nov. 20, 1984

[54] METHOD FOR THE TREATMENT OF SURFACES OF A WORKPIECE OF CARBON-CONTAINING CAST IRON

[76] Inventors: Klaus Heck, Krumenauerstr. 4; Karl Linzenkirchner, Schmellerstr. 2, both of 8070 Ingolstadt; Fritz Indra, Talstr. 25, 8939 Buchloe; Horst Lindner, Silesiusstr. 1, 8070 Ingolstadt; Hans Munnighoff, Bergstr. 46, 8074 Gaimersheim, all of Fed. Rep. of Germany

[21] Appl. No.: 379,032

[22] Filed: May 17, 1982

[30] Foreign Application Priority Data

May 19, 1981 [DE] Fed. Rep. of Germany ....... 3119847

[51] Int. Cl.$^3$ .......................... B23P 1/02; B23B 27/10
[52] U.S. Cl. .......................... 204/129.1; 204/224 M; 204/237; 204/212; 204/217; 204/275; 204/DIG. 10; 408/709; 408/40
[58] Field of Search .................... 204/224 M, 237, 26, 204/212, 217, 224 R, 275, DIG. 10, 25, 225, 129.5, 38 S; 51/290, 262 T; 408/708, 709, 40, 7 R; 29/424, 564

[56] References Cited

U.S. PATENT DOCUMENTS

| | | | |
|---|---|---|---|
| 1,844,316 | 2/1932 | Fryckberg | 408/709 |
| 1,939,205 | 12/1933 | Connor | 51/217 |
| 3,296,747 | 1/1967 | Philippsen et al. | 51/73 |
| 3,405,049 | 10/1968 | Czubak | 204/217 |
| 3,468,784 | 9/1969 | Joyce et al. | 204/224 |
| 3,499,830 | 11/1970 | Haggerty et al. | 204/224 |
| 3,751,346 | 8/1973 | Ellis et al. | 204/26 |
| 4,184,794 | 1/1980 | Henninghaus | 408/57 |
| 4,312,900 | 1/1982 | Simpson | 427/181 |

*Primary Examiner*—Brian E. Hearn
*Assistant Examiner*—Nathan Thane
*Attorney, Agent, or Firm*—Lalos, Leeds, Keegan, Lett, Marsh, Bentzen & Kaye

[57] ABSTRACT

The invention relates to a method and an apparatus for the treatment of surfaces of a workpiece of carbon-containing cast iron, and in particular of blind holes in gray iron cast workpieces, by electrochemical stock removal and mechanical reaming-and-plating. Electrochemical stock removal and mechanical reaming and plating are carried out in separate steps whose operating parameters are independently adjustable, the mechanical stock removal being essentially confined to a reaming-and-plating of the surface which does not entail a closing of graphite flakes. A cylinder bore produced by the method of the invention with desired roughness will have a dark, lustrous surface.

8 Claims, 8 Drawing Figures

METHOD FOR THE TREATMENT OF SURFACES OF A WORKPIECE OF CARBON-CONTAINING CAST IRON

BACKGROUND AND DISCUSSION OF THE INVENTION

The invention relates to a method and apparatus for the treatment of surfaces of a workpiece of carbon-containing cast iron and the resulting product.

Surface structure is of primary importance to the tribological conditions prevailing in the case of a sliding pair. Particularly in the case of gray iron cast cylinders for internal-combustion engines, the surface structure of the gray iron casting is of decisive importance with regard to low wear, reduction of friction, breaking-in behavior and gas tightness of the piston rings. For reasons of oil retention, which is an important factor in minimizing the wear of associated sliding parts moving in the area of mixed friction, so-called oil pockets must be present in the gray iron surfaces in the form of cut graphite flakes and/or machined grooves. Apart from the presence of oil, the degree of surface roughness must be low (microroughness) if friction is to be kept to a minimum. The consensus of opinion has been that optimization of the breaking-in behavior requires that the geometry of the surface be sufficiently "aggressive" to permit the parts in sliding contact to wear each other down during the breaking-in period. In the sliding pair formed by cylinder wall and piston ring, this results in good roundness coupled with good gas tightness.

Moreover, excessive surface strain hardening must be avoided to protect the piston rings in particular from undue adhesive and/or abrasive wear.

With all known finishing methods (turning, grinding, reaming) and even with the frequently practiced mechanical honing as also with electrochemical honing, the above requirements cannot be satisfactorily met in a number of respects. Due to the cutting forces in mechanical treatment, the graphite flakes become clogged and graphite may be squeezed out of the flakes to some depth. Strain hardening of the surface occurs, and this can be extensive. Because of the clogged graphite flakes, considerable surface roughness has to be generated to provide somewhat satisfactory tribological conditions. This intentional surface roughness cannot be regarded as a full substitute for open graphite flakes since it results in considerable wear as the interacting surfaces are broken in, with the oil-retaining effect then diminishing.

Crushing of the surface of the gray iron casting occurs even in electrochemical honing, in which the honing tool serves as electrode, and hence for the electrochemical removal of stock, as well as for mechanical stock removal. To maintain a given spacing between electrode and workpiece surface, the honing stones must be pressed fairly hard against the workpiece surface. Due to this contact pressure, a corresponding violent mechanical working of the surface of the workpiece takes place, and this results in a clogging of the graphite flakes and in strain hardening of the surface. Details on electrochemical honing and on the tool used with this technique may be found, for example, in the thesis "Untersuchung des Elektrochemischen Honens" by Egbert Sholz, June 22, 1968, Polytechnic Institute of Aachen.

Electrochemical honing is afflicted not only with the shortcomings described but also with additional drawbacks. For example, the tool is of complex design, and therefore expensive, since the mechanical and electrical tool components must be accommodated in the smallest possible space. A relatively small electrode surface imposes restrictions on the process parameters. High current densities and relatively high electrolyte concentrations must be employed. The choice of honing sticks is subject to severe limitations. Metallic bonds as used in diamond honing sticks cannot be employed as they would be subject to anodic metal removal. The electrolyte used in concurrent electrochemical and mechanical stock removal cannot be optimized simultaneously with respect to corrosion, wear, influencing of mechanical stock removal, tendency of the honing sticks to clog, and influencing of electrochemical stock removal. Finally, the honing sticks located in the circulating electrolyte interfere with the electrolyte flow conditions, which may result in nonuniform stock removal.

The invention described herein overcomes problems discussed above. More specifically, the invention provides a method for the treatment of surfaces of a workpiece of carbon-containing cast iron as well as an apparatus for carrying out said method whereby a surface structure of carbon-containing cast iron that is particularly well adapted to the tribological conditions prevailing in sliding pairs can be obtained economically. Also, the invention provides a cylinder for an internal-combustion engine having improved operating characteristics.

Surprisingly, it has been found that surfaces which, from the tribological point of view, are perfectly satisfactory can be produced economically by separating the electrochemical stock removal from the purely mechanical surface treatment. The above limitations to which combination tools are subject do not apply in electrochemical stock removal, which therefore permits economical electrochemical surface removal that is satisfactory from the point of view of dimensional accuracy. As a rule, this electrochemical surface removal cannot be effected in one operation down to the desired final dimensions since it is increasingly slowed down as graphite flakes become exposed and removed stock deposits on the workpiece surface. In the strictly mechanical reaming and plating of the electrolytically treated surface which follows, the protruding graphite is removed without the pockets being closed by adjacent metallic material. Moreover, what is being removed and subsequently plated on in reaming-and-plating is mainly surface constitutents of the basis metal, primarily mixed crystals. Strictly speaking, reaming-and-plating thus is not a stock-removing treatment but a reaming with simultaneous plating in which a substantial portion of the material removed is plated on to give a surface in which load-carrying level plateaus which are partly plated with graphite, mixed crystals and/or possible electrolysis residues alternate with open graphite flakes. In contrast to the conventional bright surfaces, such a surface produced in accordance with the invention has a dark, lustrous appearance.

The graphite protruding from the graphite flakes is entrained, along with the products deposited on the electrolytically treated surface, by the reaming-and-plating tool, formed preferably of planar reaming-and-plating sticks with silicon carbide in a ceramic bond and operating in an aqueous medium, and plated onto the workpiece surface.

The number of alternative steps of electrochemical stock removal and reaming-and-plating is appropriately determined by the particular requirements. An elaborate combination tool is not required in carrying out the method in accordance with the invention. Rather, tools of conventional design may be used in electrochemical stock removal and in the mechanical treatment.

Different liquids which best satisfy the individual requirements are advantageously used in electrochemical stock removal and in the mechanical treatment. In the latter, conventional liquids which result in as little strain hardening as possible may be used. On the other hand, a single liquid such as sodium nitrate, $NaNO_3$, may be used, which will simplify the practice of the method.

The wear resistance of the workpiece surface can be enhanced. Hardening may be carried out by many different conventional methods, such as remelt hardening, induction hardening, electroerosive hardening, etc.

The apparatus in accordance with the invention may be equipped with an electrical station and a mechanical station between which the workpiece is shuttled back and forth. However, the apparatus may also incorporate a greater number of individual stations adapted to the operations which are performed there.

Other advantages include an apparatus which is particularly well suited for the finishing of blind holes. The invention is particularly advantageous for the treatment of large bores, for example, cylinder sleeves for large diesel engines.

A cylinder with a bore produced by the method in accordance with the invention has a number of properties which distinguish it over cylinders used heretofore. Surprisingly, that bore has excellent breaking-in properties and a long service life even though the geometry of its surface is by no means "aggressive". The good properties of the bore, which might also be formed by a rolling treatment, are presumably due to the graphite laminated onto it and/or to the $M_{23}C_6$ mixed crystals and any further plated-on residues, which during the breaking-in period act as laps for the associated sliding part, in this case, the piston ring or rings. When broken in, the interacting surfaces will be supplied with lubricant from the finely disseminated open graphite flakes and the likewise finely disseminated oil-retaining minute pits present between the plateaus. In the case of conventional surfaces from which stock has been mechanically removed or which have been honed, only a small portion of the surface initially bears the load, and that portion increases in a nonpredictable manner during the breaking-in period. In the broken-in condition, many graphite flakes are plugged up, and only tiny pits of random distribution and size are available as oil reservoirs.

The invention is suited for the mechanical treatment of practically all surfaces of carbon-containing cast-iron workpieces with which another part is in sliding contact. It is particularly well-suited for the mechanical treatment of gray iron cast cylinder bores in internal-combustion engines. In that application, it offers substantial advantages such as: longer service life of the internal-combustion engine; better gas tightness between piston ring and cylinder; reduced oil consumption; and fewer piston rings, and hence reduced friction and reduced fuel consumption. Notwithstanding the prevailing view, these advantages are obtained even though no surface of a particularly "aggressive" geometry is available for breaking in.

The above discussion of the invention relates to some general advantages of the invention over what has existed heretofore. Other advantages will be appreciated from the detailed discussion of the preferred embodiment which follows.

BRIEF DESCRIPTION OF THE DRAWINGS

FIG. 5a is a longitudinal section through a segmented electrode disposed inside a cylinder sleeve;

FIG. 5b is a cross section through the arrangement according to FIG. 5a;

FIG. 5c shows a detail of the arrangement of FIG. 5a on an enlarged scale; and

DETAILED DESCRIPTION OF THE PREFERRED EMBODIMENT

Figure 1:
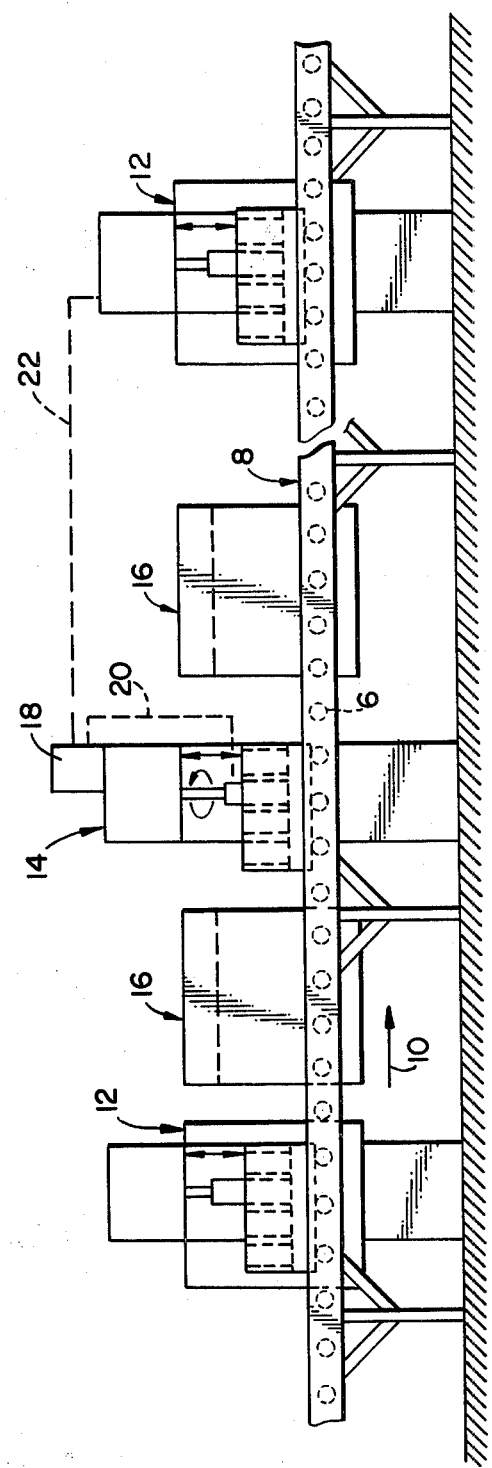
FIG. 1 is a side-elevational view of an apparatus for the mechanical treatment of a bore in a cast-iron workpiece.

As shown in FIG. 1, an apparatus for the mechanical treatment of a workpiece of carbon-containing cast iron, for example, cylinder bores in an engine block cast integral with the cylinder head which have been conventionally roughworked mechanically to a roughness of about $20\mu$, comprises a conveying means 8 formed by rolls 6 arranged in a row. The drive for the rolls 6 is not shown in detail since the conveying means 8 can be of conventional design.

Electrical stations 12 and mechanical stations 14, of each of which one is shown, are alternately disposed along the conveying means 8, whose direction of motion is indicated by an arrow 10. A cleaning station 16 is located between every electrical station 12 and mechanical station 14.

The passage of the workpiece, which is not shown, through the section of the apparatus shown is such that the workpiece, which in FIG. 1 enters from the left, is stopped in the electrical station 12 and there is electrochemically treated in a manner to be described further on. After such treatment, the workpiece is carried from the electrical station 12 to the cleaning station 16, there freed of electrolyte residue, and then moved to the mechanical station 14, where it is mechanically treated. From there it goes to the next cleaning station 16, where it is freed of any residual cutting oil or emulsion, following which it is routed to the next electrical station 12.

Also shown in FIG. 1 is a control device 18 which is associated with the mechanical station 14 and in which the diameter of a hole formed in the workpiece is determined conventionally, for example, by the back-pressure method. The measured value is fed to the control device 18 through a measuring line 20. On the basis of the diameter so determined, the current intensity and the treating time of the workpiece in the subsequent electrochemical stock removal in the electrical station 12 are determined in the control device 18, the electrical station 12 being controlled through a control line 22.

Figure 2:
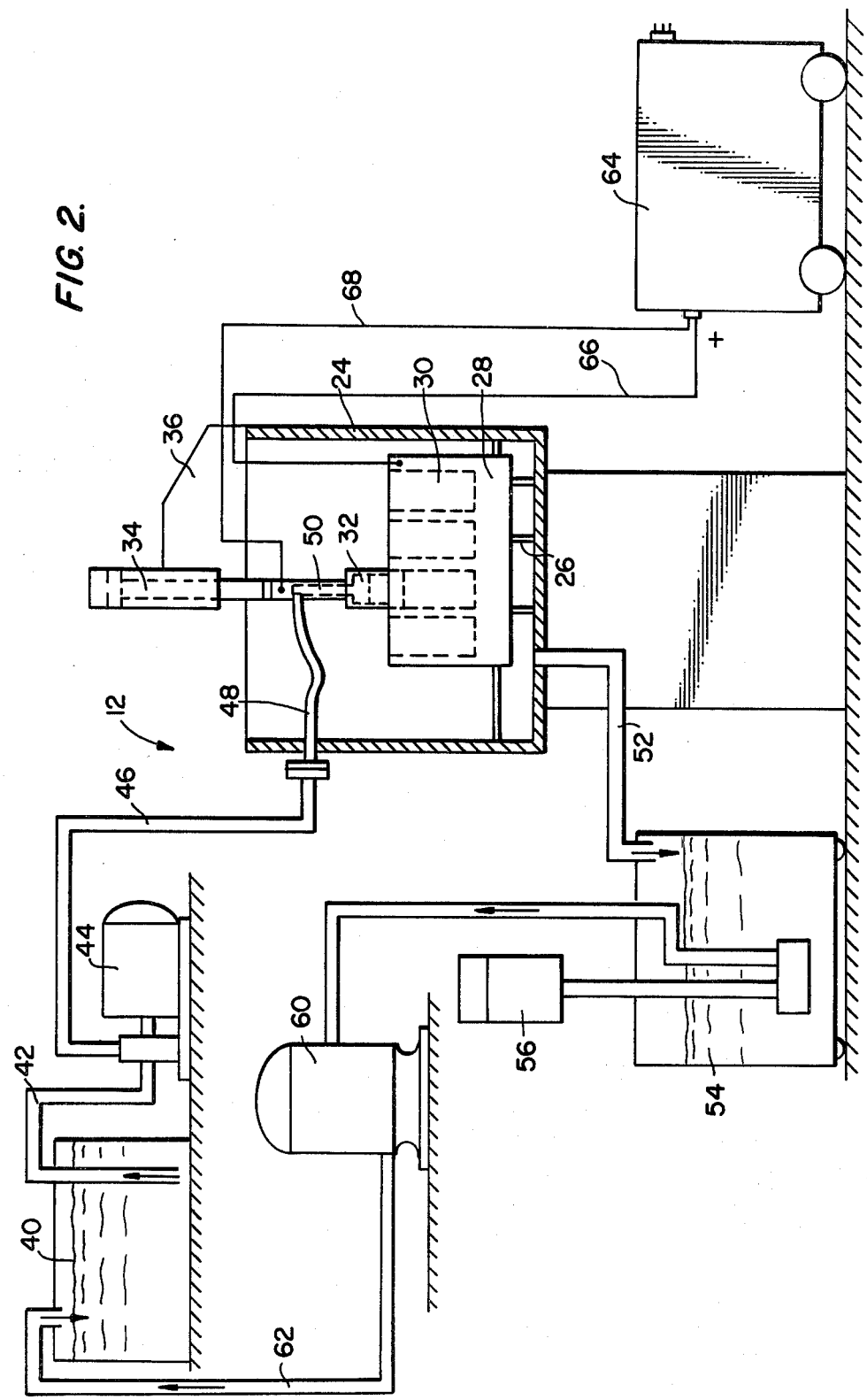
FIG. 2 shows an electrical station of the apparatus according to FIG. 1.

Details of an electrical station 12 are shown in FIG. 2. A workpiece 28, which in this case is a metal block having four blind-end bores 30, is held in a particular position by means of a work-holding and adjusting means 26 in a treating tank 24. An electrode 32 shown in greater detail in FIG. 3 and actuated by a hydraulic cylinder 34 which is mounted on a column 36 is being inserted in one of the bores 30. Through the hydraulic cylinder 34, the electrode 32 can be moved into any position within the bore to be treated.

To supply the electrode with electrolyte, an electrolyte storage tank 40 is provided which through a line 42 is connected to a pump 44 which pipes electrolyte into a line 46. Within the storage tank 24, the line 46 is extended as a hose 48 which is connected to a hollow electrode holder 50.

The electrolyte issuing from the electrode 32 and flowing out of the particular bore 30 being treated passes into a return line 52 which discharges into an intermediate tank 54. From there the electrolyte is piped by means of a submerged pump 56 to a centrifuge 60 whereby the electrolyte is purified. From the centrifuge 60, the electrolyte is piped through a line 62 back to the electrolyte storage tank 40.

A power supply 64 whose positive terminal is connected through a cable 66 to the workpiece 28 and whose negative terminal is connected through a cable 68 to the electrode 32 supplies the current.

The electrochemical treatment of the workpiece 28 in the electrical station 12 proceeds conventionally. The electrode 32, which is electrically insulated from the hydraulic cylinder 34, is inserted in the particular bore 30 to be treated. The electrolyte circulation is started and the power supply is switched on. In the electrochemical treating operation, the electrode 32 may be stationary or, depending on the requirements, rotate or simultaneously execute a rotational and translational motion.

Figure 3:
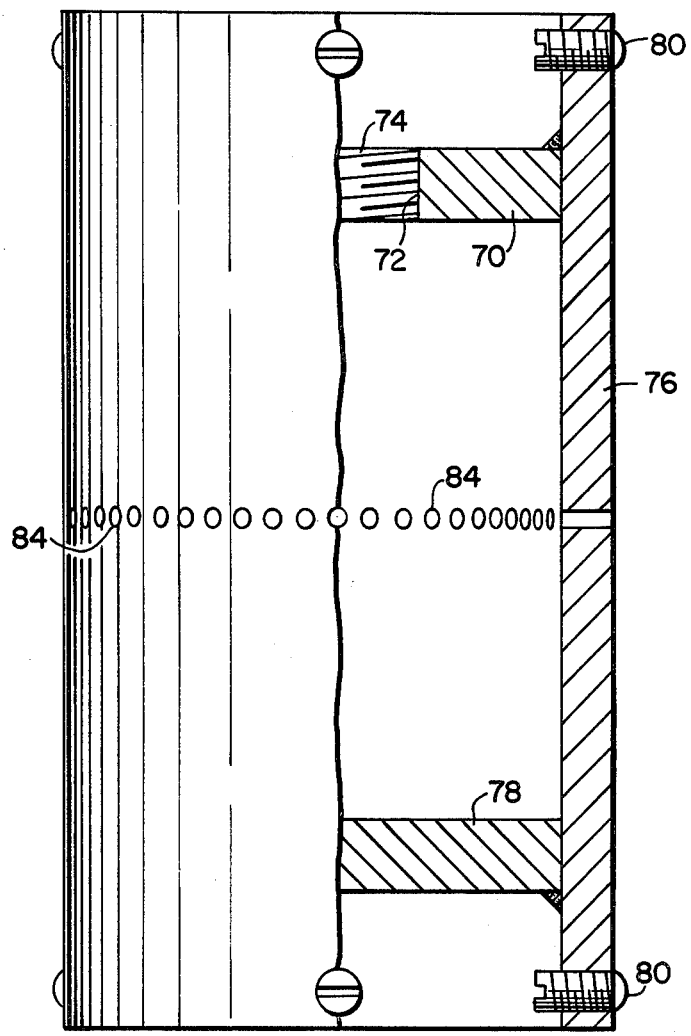
FIG. 3 shows an electrode of the type used in the electrical station of FIG. 2.

FIG. 3 shows an electrode 32 whose right half is cut open. This electrode is a closed, over-all cylindrical hollow body whose upper end wall 70 comprises a connecting opening 74 provided with a thread 72. Into the connecting opening 74 a connecting pipe can be screwed through which the current and the electrolyte are introduced and which serves to mount the electrode 32 on the hydraulic cylinder 34 (FIG. 2). The peripheral wall 76 of the electrode 32 extends beyond the upper end wall 70 and a lower end wall 78 and is provided with spacing members 80 whereby the cylindrical circumference can be set for a given spacing when the electrode is inserted in a bore 30 to be treated. The spacing members 80 are, of course, made of an insulating material, such as ceramic or plastic.

The peripheral wall 76 of the electrode 32 is provided in its transverse central plane with electrolyte discharge openings 84.

The electrolyte discharge openings 84 may, of course, be distributed over the circumference 82 on the basis of the particular requirements and the desired results. The electrolyte discharge openings 84 may be circular or of any other geometrical configuration. The effective surface of the electrode, in other words, the electrically conducting portion of the circumference, may extend over the entire circumference or may, through electrical insulation of a portion of the surface, be confined to just part of the circumference.

Figure 4:
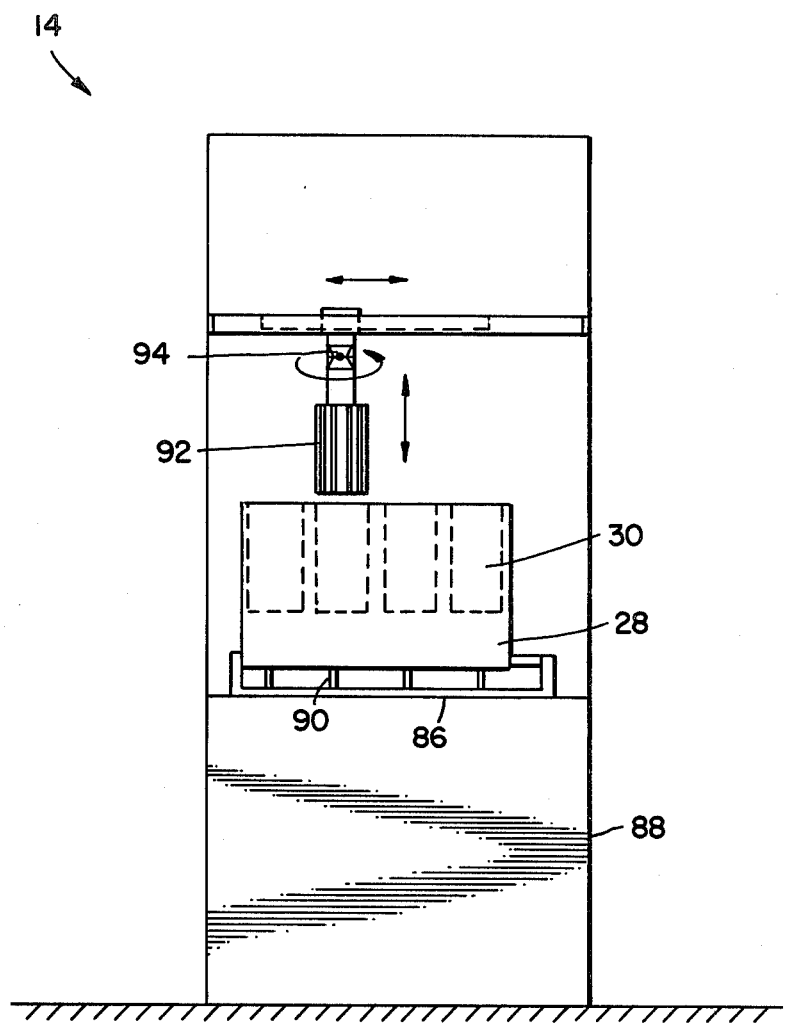
FIG. 4 shows a mechanical station of the apparatus according to FIG. 1.

Shown in FIG. 4 is a mechanical station 14. The workpiece 28 rests on a support 86 which is mounted on a frame 88. For precise positioning of the workpiece 28, the support 86 is provided with work-holding and adjusting means 90. Above the workpiece 28, a mechanical reaming-and-plating tool 92 is adapted to be moved on carriage guideways on the frame 88 in all three directions in space, and through a universal joint 94 is connected to a rotary drive (not shown) which is further adapted to be moved up or down.

After the workpiece 28 has been moved into the support 86 and accurately positioned with the work-holding and adjusting means 90, the reaming-and-plating tool 92 is lowered into one of the bores 30. The graphite flakes which have been exposed during the electrochemical stock removal, exposed mixed crystals, or electrochemical process residues are then mechanically reamed and plated on. Depending on the reaming-and-plating tool 92 used, this may be attended by an improvement in the geometry and by the generation of the desired surface roughness and form.

A variety of tools are suited for use as reaming-and-plating tool 92, for example, tools resembling honing reamers which generate their working pressure by a flywheel effect, rotary brushes with abrasive, or simply steel or nonferrous metal rotary brushes. In order that the mechanical treatment may essentially be limited to reaming and plating, a low treating pressure must be employed, and no clogging of the graphite flakes forming oil pockets and no substantial strain hardening of the surface will then occur. The reaming-and-plating tool 92 may execute either a rotational motion or a combined rotational and translational motion.

Now when, for example, a honing reamer with abrasive sticks formed of silicon carbide in a ceramic bond is used as reaming-and-plating tool 92 and the contact pressure between the substantially plane abrasive sticks and the workpiece surface is not more than about $10^5$ $N/m^2$, the graphite protruding from the graphite flakes and any residues precipitated onto the electrochemically treated surface will be entrained by the abrasive sticks and partly plated onto the surface being treated. Since reaming and plating take place only after an electrochemical stock-removing step, the graphite, along with any deposits, will suffice for selective plating of the workpiece surface with graphite and/or $M_{23}C_6$ mixed crystals, preferably in a surface density ranging from $0.5 \times 10^{-4}$ to $5 \times 10^{-4}$ $g/cm^2$.

When electrolyte is used in place of a cutting oil or emulsion in the mechanical reaming-and-plating treatment, the cleaning stations 16 (FIG. 1) may be dispensed with.

The apparatus as a whole may be assembled from a plurality of stations arranged in a row, as shown in FIG. 1. It may also be designed as a double station, the workpiece being treated alternately in the single mechanical station and in the single electrical station.

Moreover, in the electrolytic stock removal taking place in the electrical station or stations, more stock may obviously be removed at the start of the finishing treatment of a workpiece than toward the end. This is true also of the stock removal occurring in the mechanical station. The charge in the final step of electrolytic stock removal advantageously ranges from about 5 to 15 ampere-seconds per square centimeter of surface being treated, this charge being turned over between 3 and 17 sec, for example. In the final mechanical stock removal, there is advantageously only about 1 to $5\mu$ overlapping between tool and workpiece. Of course, after sufficiently fine strictly mechanical roughworking, a single electrolytic stock-removing operation followed by reaming-and-plating as finishing operation may suffice.

In the case of workpiece surfaces which will be subjected to maximum loads, it is advisable to interpose a surface-hardening step between at least one of the mechanical treating steps and electrolytic treating steps.

Figure 5:
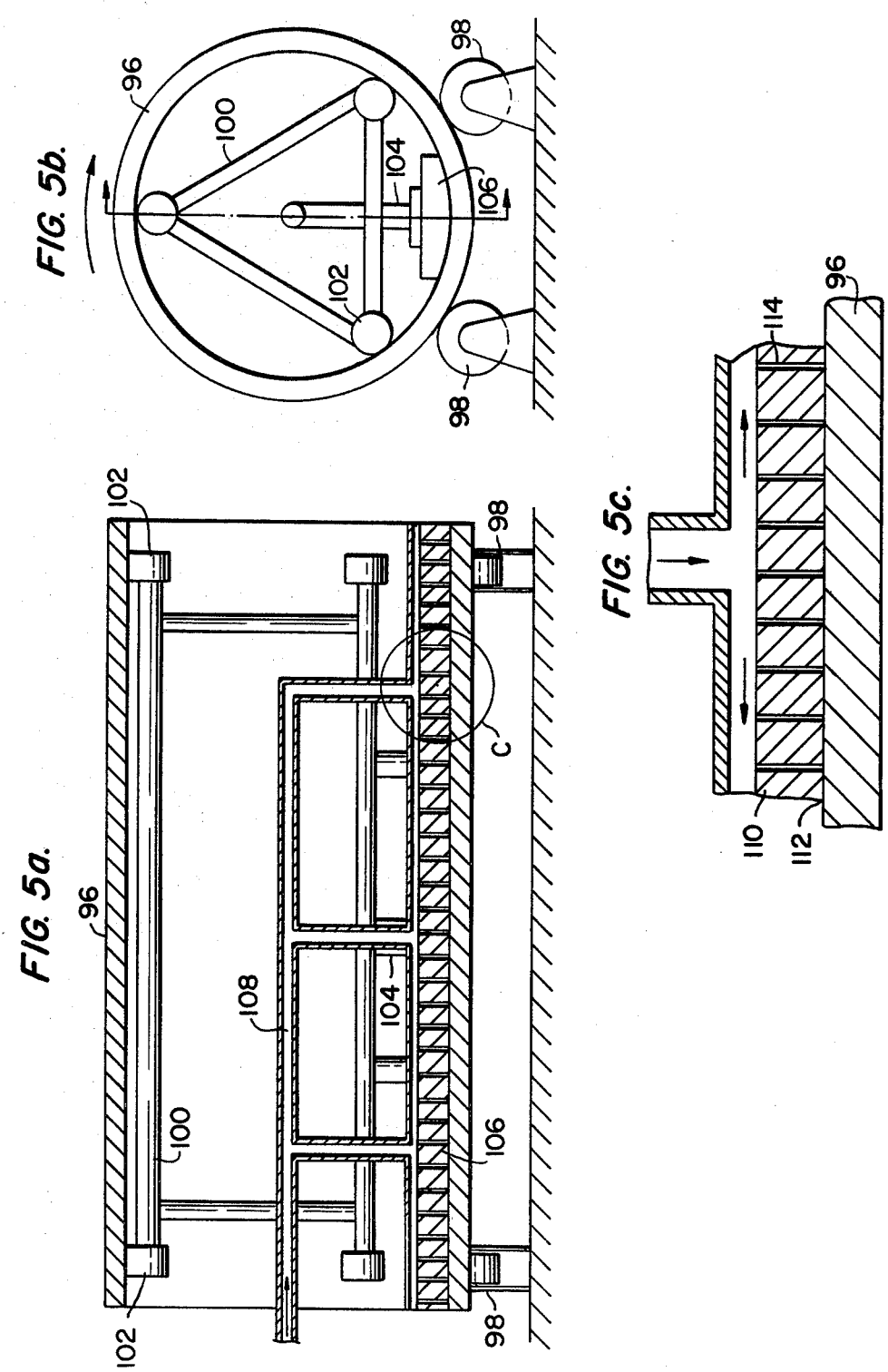

FIGS. 5a, 5b and 5c illustrate an electrical station of the type used in the treatment of cylinder sleeves for large diesel engines. With workpieces of this size, it is not advisable to work with a maximum electrochemically effective surface area. Here a segmented electrode is used to advantage.

A cylinder sleeve 96 rests on rolls 98 which may be driven in rotation. A supporting frame 100 projects into the cylinder sleeve 96. It is supported by means of rolls 102 on the inner periphery of the cylinder sleeve 96 so that a girder 104 mounted on the suporting frame 100 is aligned with the center of the cylinder sleeve 96. Mounted on the girder 104 is a segmented electrode 106 to which electrolyte is fed through lines 108.

As may be seen in FIG. 5c, the segmented electrode 106 is held so that there is a small gap 112 between the external surface of its outer wall 110 and the cylinder sleeve 96. The outer wall is provided with electrolyte discharge openings 114 through which the electrolyte fed to the segmented electrode 106 flows into the gap 112.

In the electrolytic removal of stock, the cylinder sleeve 96 and, through a suitable drive of the frame structure 100, the segmented electrode 106 can be moved relative to each other. It is then possible to impart to the cylinder sleeve 96 only a rotational motion, for example, and to the segmented electrode 106 only a translational motion. Both the rolls 102 and the segmented electrode 106 are, of course, advantageously mounted on hydraulic cylinders (not shown) which permit the supporting frame 100 to be aligned within the cylinder sleeve 96 and the gap 112 to be adjusted.

Figure 6:
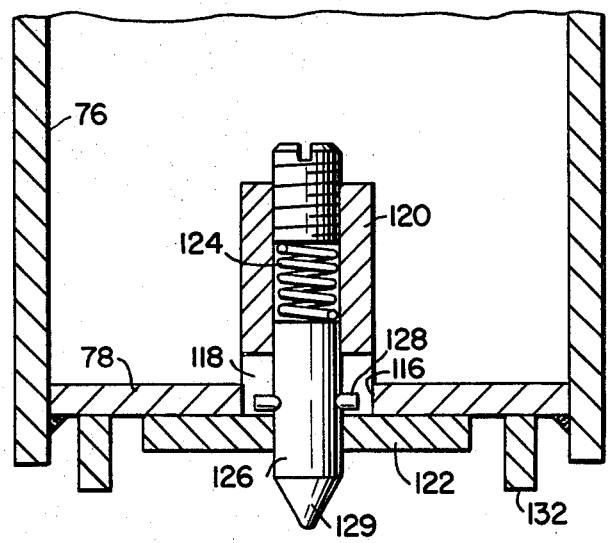
FIG. 6 is a section through an electrode suitable particularly for blind holes.

Shown in FIG. 6 is the lower end of an electrode constructed in a manner similar to the electrode of FIG. 3 and comprising a peripheral wall 76 and a lower end wall 78 provided with a center hole 116. A bushing 120 which is provided with a slot 118 and extends through said hole 116 is bolted to the end wall 78 through a plate 122. A bolt 126 is adapted to move in the bushing against the force of a spring 124, the amplitude of its motion being limited by the slot 118 and a pin 128. Bonded to the forward end of the bolt is an electrically insulating cone 129 made, for example, of a ceramic material which penetrates into a conical centering bore at the bottom of a blind-end bore to be treated in the workpiece, which here is not shown, to center the electrode in the blind-end bore. To relieve the load on the centering guide described, additional stops 132 made of an electrically insulating material are provided on the end wall 78.

We claim:

1. A method for the treatment of surfaces of a workpiece of carbon-containing cast iron in cast-iron workpieces comprising:
   removing electrochemically stock from the surface of a workpiece;
   mechanically treating said surface;
   said electrochemical stock removing step and mechanical treating step being carried out in at least two separate steps whose operating parameters are independently adjustable; and
   said mechanical treating step including reaming-and-plating of said surface substantially without closing of graphite flakes.

2. A method according to claim 1, wherein in at least the electrochemical stock removing step the charge ranges from about 5 to about 15 ampere-seconds per square centimeter.

3. A method according to claim 1 wherein said mechanical treating step includes overlapping the workpiece and a reaming-and-plating tool from about 1 to about 5μ.

4. A method according to claim 1 wherein in the mechanical treating step a contact pressure which ranges from $10^4$ to $5 \times 10^5$ N/m$^2$ and which preferably is $10^5$ N/m$^2$ is used between the workpiece and a reaming-and-plating tool.

5. A method according to claim 1 wherein the electrochemical stock removing step and reaming-and-plating step are performed while the workpiece surface is being wetted with different liquids.

6. A method according to claim 1, 2, 3, 4 or 5 wherein between an electrochemically treating step and a mechanical treating step at least part of the workpiece surface is hardened.

7. A method for the treatment of surfaces of a workpiece of carbon-containing cast iron in cast-iron workpieces comprising:
   removing electrochemically stock from the surface of a workpiece;
   mechanically treating said surface;
   said electrochemical stock removing step and mechanical treating step being carried out in at least two separate steps whose operating parameters are independently adjustable; and
   said mechanical treating step including reaming-and-plating substantially simultaneously of said surface substantially without closing of graphite flakes.

8. The method according to claim 7 wherein said mechanical treating step of reaming-and-plating simultaneously is accomplished without electrolysis and without stock removal whereby the material removed is plated on the surface by a mechanical tool.

* * * * *